US011235871B2

(12) United States Patent
Liu et al.

(10) Patent No.: US 11,235,871 B2
(45) Date of Patent: Feb. 1, 2022

(54) CONTROL METHOD, CONTROL SYSTEM, AND SMART GLASSES FOR FIRST PERSON VIEW UNMANNED AERIAL VEHICLE FLIGHT

(71) Applicant: SZ DJI TECHNOLOGY CO., LTD., Shenzhen (CN)

(72) Inventors: Huaiyu Liu, Shenzhen (CN); Jun Wu, Shenzhen (CN); Ming Gong, Shenzhen (CN); Ning Ma, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/133,316

(22) Filed: Sep. 17, 2018

(65) Prior Publication Data
US 2019/0011908 A1 Jan. 10, 2019

Related U.S. Application Data

(63) Continuation of application No. PCT/CN2016/080605, filed on Apr. 29, 2016.

(51) Int. Cl.
*B64C 39/02* (2006.01)
*G06F 3/02* (2006.01)
(Continued)

(52) U.S. Cl.
CPC .......... *B64C 39/024* (2013.01); *G02B 27/017* (2013.01); *G05D 1/0016* (2013.01);
(Continued)

(58) Field of Classification Search
CPC .. G05D 1/0016; G05D 1/0022; G05D 1/0038; G05D 1/101; B64C 39/024;
(Continued)

(56) References Cited

U.S. PATENT DOCUMENTS

2011/0221672 A1* 9/2011 Osterhout ............ G02B 27/017
345/156
2011/0221692 A1* 9/2011 Seydoux ............. G06F 3/04817
345/173
(Continued)

FOREIGN PATENT DOCUMENTS

CN 101192064 A 6/2008
CN 103558691 A 2/2014
(Continued)

OTHER PUBLICATIONS

Fat Shark, "Radio Setup for Head Tracking", Dec. 22, 2014, Fat Shark RC (Year: 2014).*
(Continued)

*Primary Examiner* — Anne Marie Antonucci
*Assistant Examiner* — Andrew J Cromer
(74) *Attorney, Agent, or Firm* — Anova Law Group, PLLC

(57) ABSTRACT

A system for controlling an unmanned aerial vehicle (UAV) includes smart glasses and a remote controller. The smart glasses are configured to establish a first channel directly with the UAV, receive first person view (FPV) image data directly from the UAV through the first channel, and display the FPV image data. The remote controller is configured to establish a second channel directly with the UAV, and send a flight control instruction directly to the UAV through the second channel.

20 Claims, 6 Drawing Sheets

(51) Int. Cl.
*G05D 1/10* (2006.01)
*G06F 3/0482* (2013.01)
*G06F 3/01* (2006.01)
*G02B 27/01* (2006.01)
*G05D 1/00* (2006.01)

(52) U.S. Cl.
CPC ......... *G05D 1/0022* (2013.01); *G05D 1/0038* (2013.01); *G05D 1/101* (2013.01); *G06F 3/011* (2013.01); *G06F 3/017* (2013.01); *G06F 3/02* (2013.01); *G06F 3/0482* (2013.01); *B64C 2201/146* (2013.01); *G02B 2027/0187* (2013.01)

(58) Field of Classification Search
CPC ........ B64C 2201/127; B64C 2201/146; G02B 27/017; G06F 3/011; G06F 3/017; G06F 3/02; G06F 3/0482; G06F 3/012; G06T 19/006
See application file for complete search history.

(56) References Cited

U.S. PATENT DOCUMENTS

| | | | | |
|---|---|---|---|---|
| 2012/0238218 | A1* | 9/2012 | Stine | H04W 16/00 455/67.11 |
| 2015/0142213 | A1* | 5/2015 | Wang | G05D 1/0016 701/2 |
| 2015/0293362 | A1* | 10/2015 | Takahashi | G09G 5/00 348/47 |
| 2016/0313732 | A1* | 10/2016 | Seydoux | G05D 1/0038 |
| 2017/0061813 | A1* | 3/2017 | Tao | G09B 9/08 |

FOREIGN PATENT DOCUMENTS

| | | |
|---|---|---|
| CN | 104111658 A | 10/2014 |
| CN | 104718509 A | 6/2015 |
| CN | 104811615 A | 7/2015 |
| CN | 104820497 A | 8/2015 |
| CN | 204925512 U | 12/2015 |
| CN | 105222761 A | 1/2016 |
| CN | 105334863 A | 2/2016 |
| CN | 105334864 A | 2/2016 |
| CN | 205121341 U | 3/2016 |
| EP | 2557468 A2 | 2/2013 |

OTHER PUBLICATIONS

Le Tan Phuc, "Fatshark Predator V2—Some Details", Sep. 24, 2014, https://letanphuc.net/2014/09/fatshark-predator-v2-details/ (Year: 2014).*

The World Intellectual Property Organization (WIPO) International Search Report for PCT/CN2016/080605 dated Jan. 20, 2017 8 pages.

* cited by examiner

CONTROL METHOD, CONTROL SYSTEM, AND SMART GLASSES FOR FIRST PERSON VIEW UNMANNED AERIAL VEHICLE FLIGHT

CROSS-REFERENCE TO RELATED APPLICATION

This application is a continuation application of International Application No. PCT/CN2016/1080605, filed on Apr. 29, 2016, the entire contents of which are incorporated herein by reference.

TECHNICAL FIELD

The present disclosure relates to the field of unmanned aerial vehicle and, more particularly, to a control method, a control system, and smart glasses for first person view flight of unmanned aerial vehicle.

BACKGROUND

In a first person view (FPV) flight, images captured by a camera of an unmanned aerial vehicle (UAV) are transmitted to glasses in real time through an image transmission circuit at the UAV. A user can watch the images captured by the camera and control a flight of the UAV. Through the FPV flight, the user may not need to look up to the UAV, but can obtain the same view as the UAV, so as to control the UAV under the view of the UAV. Thus, an immersive flight experience may be achieved.

In conventional technologies, for achieving an FPV flight, the UAV and a remote controller communicate with each other through wireless communication means such as a private communication protocol or wireless fidelity (WiFi). The remote controller receives image signals from the UAV and sends the image signals to the glasses through wired communication means such as universal serial bus (USB). However, in this way, because a remote controller is needed for relay, delays in image transmission signals and control signals may occur, and the UAV flight may not be promptly and accurately controlled, resulting in safety hazards.

SUMMARY

In accordance with the disclosure, there is provided a system for controlling an unmanned aerial vehicle (UAV) that includes smart glasses and a remote controller. The smart glasses are configured to establish a first channel directly with the UAV, receive first person view (FPV) image data directly from the UAV through the first channel, and display the FPV image data. The remote controller is configured to establish a second channel directly with the UAV, and send a flight control instruction directly to the UAV through the second channel.

Also in accordance with the disclosure, there is provided a method for controlling an unmanned aerial vehicle (UAV). The method includes controlling smart glasses to establish a first channel directly with the UAV, controlling the smart glasses to receive first person view (FPV) image data directly from the UAV through the first channel and to display the FPV image data, controlling a remote controller to establish a second channel directly with the UAV, and controlling the remote controller to send a flight control instruction directly to the UAV through the second channel.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Figure 1:
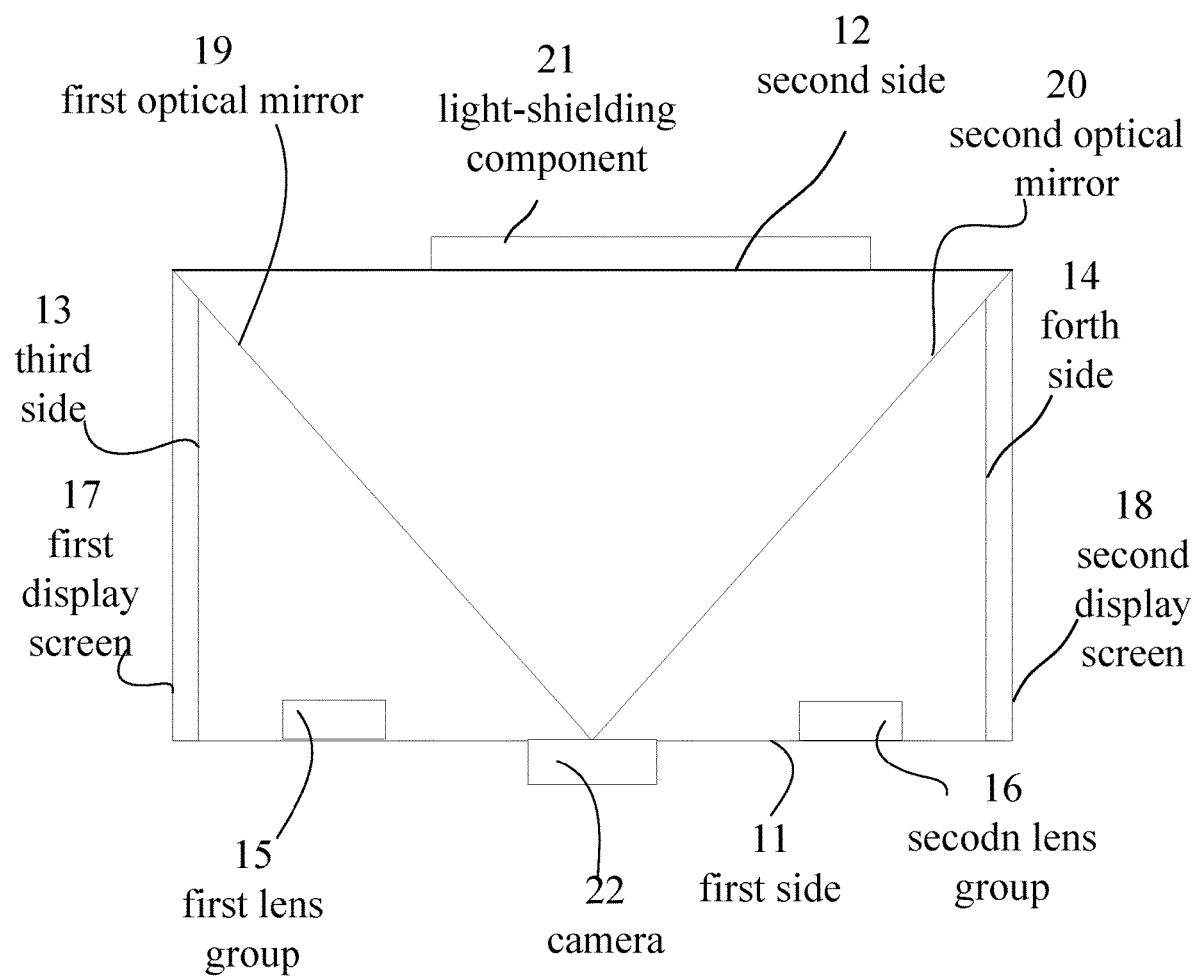
FIG. 1 is a schematic view of exemplary smart glasses according to various disclosed embodiments of the present disclosure.
Figure 2:
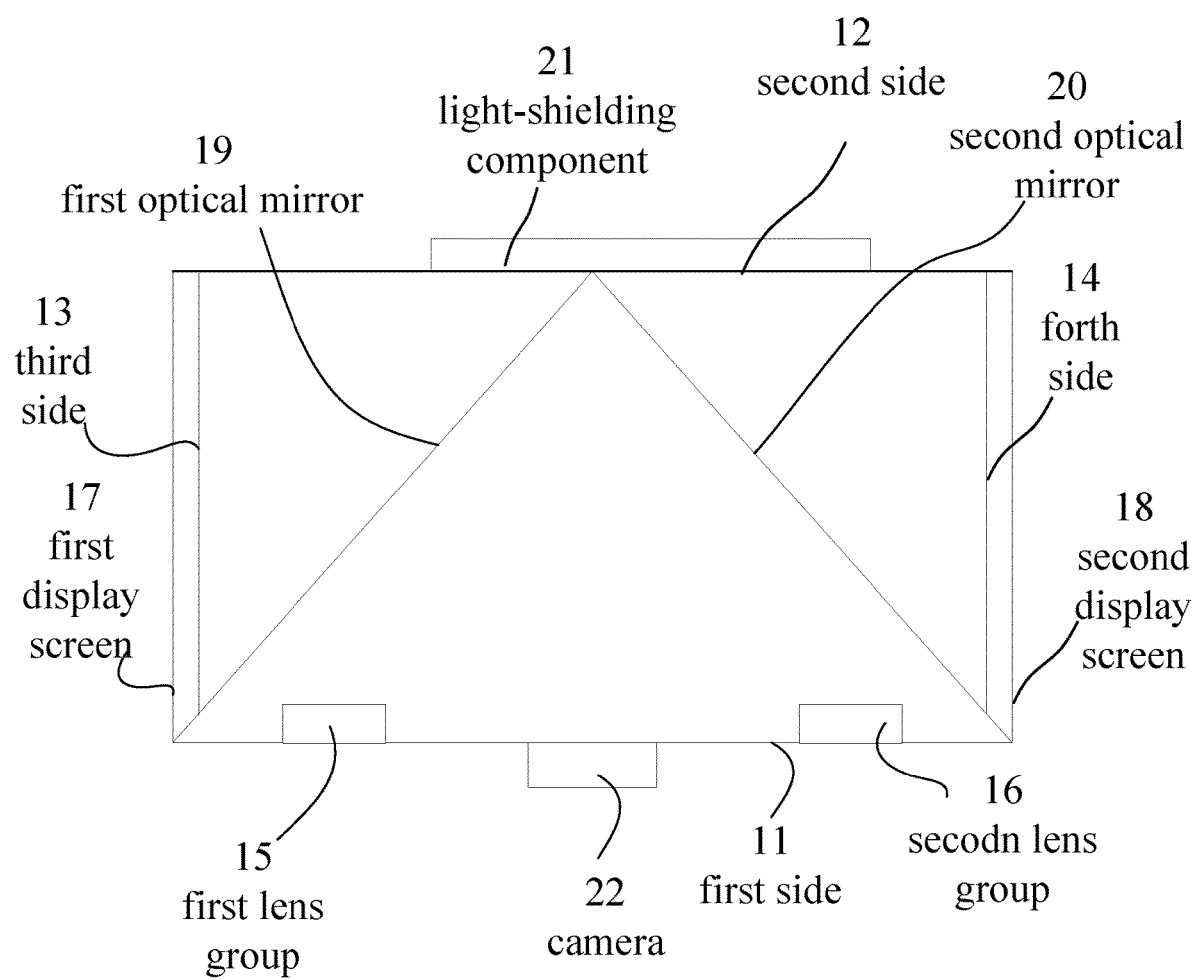
FIG. 2 is another schematic view of exemplary smart glasses according to various disclosed embodiments of the present disclosure.

FIG. 1 is a schematic view of exemplary smart glasses according to various disclosed embodiments of the present disclosure. FIG. 2 is another schematic view of other exemplary smart glasses according to various disclosed embodiments of the present disclosure. As shown in FIGS. 1 and 2, a set of glasses include a housing. The housing includes a first side 11, a second side 12, a third side 13, a fourth side 14, a first lens group 15, a second lens group 16, a first display screen 17, a second display screen 18, a first optical mirror 19, a second optical mirror 20, and a selective light-shielding component 21.

The first side 11 and the second side 12 are arranged opposite to each other. The third side 13 and the fourth side 14 are both connected to the first side 11 and the second side 12, and are opposite to each other.

The first lens group 15 and the second lens group 16 are spaced apart from each other, and are arranged at the first side 11.

The first display screen 17 and the second display screen 18 are arranged at the third side 13 and the fourth side 14, respectively.

The first optical mirror 19 and the second optical mirror 20 are arranged crosswise in the housing. The first optical mirror 19 is configured to reflect image light outputted by the first display screen 17 to the first lens group 15. The second optical mirror 20 is configured to reflect image light outputted by the second display screen 18 to the second lens group 16.

The selective light-shielding component 21 is arranged at the second side 12. The selective light-shielding element 21 can be switched between a light-shielding status and a light-transmitting status. In some embodiments, the first optical mirror 19 and the second optical mirror 20 may include semi-reflective semi-transparent (SRST) mirrors. When the selective light-shielding component 21 is at a light-transmitting status, the first optical mirror 19 and the second optical mirror 20 may further transmit light of a real scene outside the smart glasses to the first lens group 15 and the second lens group 16, such that the user can observe the real scene and a virtual scene through the first lens group 15 and the second lens group 16 at the same time.

In some embodiments, the first display screen 17 and the second display screen 18 may have, for example, a resolution of, e.g., 1920×1080 or 2560×1440, and a refresh rate of, e.g., 60 Hz. Further, the first display screen 17 and the second display screen 18 may be arranged over two ends of the smart glasses, respectively, i.e., the third and fourth sides of the housing of the smart glasses, and may be parallel to a direction of an optical axis of a user eye.

In some embodiments, each of the first lens group 15 and the second lens group 16 may include a combination of a concave lens and a convex lens. The concave lens may reduce a field of view and allow light within a certain range to pass through a lens group. The convex lens may further enlarge an image to enhance a sense of immersion. Each of the first lens group 15 and the second lens group 16 may be arranged at an angle with respect to each of the first display screen 17 and the second display screen 18. In some embodiments, the angle may be, for example, approximately 90 degrees.

In some embodiments, optical axis directions of the first lens group 15 and the second lens group 16 may be parallel to each other, and display surfaces of the first display screen 17 and the second display screen 18 may be parallel to the optical axis directions of the first lens group 15 and the second lens group 16.

In some embodiments, positions of the first lens group 15 and the second lens group 16 at the first side 11 may be adjustable. For example, a relative movement between the first lens group 15 and the second lens group 16 at the first side 11 may be performed.

In some embodiments, the first optical mirror 19 and the second optical mirror 20 may include glass or plexiglass that can partially-reflect and partially transmit incident light. For example, light transmittance may be selected to be approximately 30%, and light reflectance may be selected to be approximately 70%. In some other embodiments, the first optical mirror 19 and the second optical mirror 20 may both include light-transmitting glass coated with an SRST film. The first optical mirror 19 and the second optical mirror 20 may be arranged tilted with respect to the optical axis directions of the first lens group 15 and the second lens group 16, respectively. Tilt angles of the first optical mirror 19 and the second optical mirror 20 with respect to the first lens group 15 and the second lens group 16 can be adjusted according to positions of the first lens group 15 and the second lens group 16 at the first side 11. In some embodiments, the first optical mirror 19 and the second optical mirror 20 may be arranged tilted with respect to the first lens group 15 and the second lens group 16 at approximately 45 degrees, respectively.

In some embodiments, the first optical mirror 19 and the second optical mirror 20 may include, but are not limited to, reflective mirrors.

The light transmittance of the selective light-shielding component 21 may be adjustable. In some embodiments, the selective light-shielding component 21 may include a liquid crystal display screen (LCD screen), and the LCD screen may adjust light transmittance according to an applied voltage value. As such, the selective light-shielding component 21 can operate in one of two statuses, i.e., a transparent status and a light-shielding status. In the transparent status, the light transmittance may be close to approximately 100%. In the light-shielding status, light may not pass through the selective light-shielding component 21.

When the selective light-shielding component 21 is in the light-shielding status, light outside the smart glasses may not enter the smart glasses, and light from the first display screen 17 and the second display screen 18 may be reflected by the first optical mirror 19 and the second optical mirror 20 and enter the first lens group 15 and the second lens group 16. Accordingly, the visual experience of the user eyes may be immersion in virtual reality. The selective light-shielding component 21 may be arranged at certain angle(s) with respect to the first display screen 17 and the second display screen 18. In some embodiments, the selective light-shielding component 21 may be arranged at approximately 90 degrees with respect to the first display screen 17 and the second display screen 18.

When the selective light-shielding component 21 is adjusted to be transparent, light outside the glasses can enter into the glasses. The light may pass through the first optical mirror 19 and the second optical mirror 20, and may be superimposed on reflected light reflected by the first optical mirror 19 and the second optical mirror 20 to generate an augmented reality effect.

The superposition effect of the external scene with the first display screen 17 and the second display screen 18 may depend on light transmittances of the first optical mirror 19 and the second optical mirror 20, an intensity of external light, and brightnesses of the first display screen 17 and the second display screen 18. The brightnesses of the first display screen 17 and the second display screen 18 can be adjusted in response to the external light intensity to achieve a stable superposition effect in different scenarios. In some embodiments, the user can manually adjust the brightnesses of the first display screen 17 and the second display screen 18.

In some embodiments, the smart glasses can directly establish a first channel with the UAV without relaying by the remote controller, such that the smart glasses can receive FPV image data directly from the UAV through the first channel and display the FPV image data, and may display the FPV image data on the first display screen 17 and the second display screen 18. Here, directly establishing channel between two devices means the there is no third device between the two devices to relay data, i.e., data can be sent from one of the two devices to the other one of the two devices without going through the third device.

In some embodiments, the smart glasses can also obtain flight status data of the UAV directly from the UAV. The flight status data of the UAV may be further displayed on the first display screen 17 and the second display screen 18, to superimpose on the FPV image data displayed on the first display screen 17 and the second display screen 18, such that the user can also see the flight status data of the UAV at the same time through the first lens group 15 and the second lens group 16. The flight status data of the UAV may include, but is not limited to, a location of the UAV, a direction of the UAV, remaining power, a flight path, obstacle information, flight altitude and flight speed, a nose orientation of the UAV, an orientation of a gimbal at the UAV, an operation prompt, an FPV video, etc.

In some embodiments, the above-described virtual scene may include a virtual operation interface. Referring to FIGS. 1 and 2, in these embodiments, the smart glasses may further include a camera 22 and a processor (not shown in FIGS. 1 and 2) for processing images from the camera 22. The camera 22 is arranged at the housing and captures an image of a gesture operation, also referred to as a gesture operation image, of the user through the camera 22. The processor may be arranged in the housing and may be configured to process the gesture operation image, determine coordinates of the gesture operation, and to compare with an imaging position of the virtual operation interface, such that a control instruction corresponding to the gesture operation of the user may be recognized and a corresponding operation may be performed.

That is, an operation interface may be displayed on the first display screen 17 and the second display screen 18, and may be reflected by the first optical mirror 19 and the second optical mirror 20 to form a virtual operation interface. The camera 22 may capture a gesture operation image of the user. The gesture operation image may be processed by the processor 23 to determine coordinates of the gesture operation. The processor may further compare coordinates of the gesture operation with an imaging position of the virtual operation interface, such that a control instruction corresponding to the gesture operation of the user may be recognized and a corresponding operation may be performed.

When the virtual operation interface includes a virtual operation interface for glasses menu, correspondingly the control instructions may include a control instruction for the smart glasses. When the virtual operation interface includes a virtual operation interface for the UAV remote controller, correspondingly, the control instruction may include a control instruction for the UAV. Control instructions for the UAV may include control instructions for the gimbal and/or control instructions for the UAV flight. The control instructions for the gimbal may be configured to control the gimbal of the UAV and an imaging apparatus carried by the gimbal. The control instructions for the UAV flight may be configured to control the UAV flight.

In some embodiments, the smart glasses may also directly recognize a user gesture motion to perform a corresponding operation. In these embodiments, referring to FIGS. 1 and 2, the smart glasses include a camera 22, as well as a memory and a processor (not shown in FIGS. 1 and 2). The camera 22 is arranged at the housing. The camera 22 may be configured to capture, i.e., photograph, a gesture motion of a user. The memory may store a plurality of user gesture motion models and a plurality of control instructions corresponding to the plurality of user gesture motion models. The memory and the processor both may be arranged in the housing. The processor may be electrically connected to the camera 22 and the memory. The processor may be configured to generate a gesture motion model according to the user gesture motion captured by the camera 22 to compare with the plurality of user gesture motion models stored in the memory. In response to the generated gesture motion model being consistent one of the plurality of user gesture motion models stored in the memory, a control instruction corresponding to the one of the plurality of user gesture motion models may be triggered. That is, in response to the generated gesture motion model being consistent with one of the plurality of user gesture motion models stored in the memory, a control instruction corresponding to the generated gesture motion model may be triggered.

The plurality of user gesture motion models stored in the memory may be obtained by photographing a plurality of user gesture motions through the camera and defining each user gesture motion model in advance. That is, by capturing, i.e. photographing, and recognizing a plurality of user gesture motions in advance, corresponding user gesture motion models may be generated. Further, a control instruction uniquely corresponding to each user gesture motion model may be defined and stored in the memory.

The control instruction may include a gimbal control instruction for controlling a gimbal of the UAV, and/or a glasses control instruction for controlling the smart glasses, and/or a flight control instruction for controlling the UAV flight. The control instruction may include another control instruction that is not listed.

In some embodiments, based on the camera 22 at the smart glasses, contents displayed on the first display screen 17 and the second display screen 18 may also be customized according to various application scenarios. For example, a face image, a two-dimensional (2D) code image, or the like may be captured through the camera 22. Correspondingly, the face image, the two-dimensional (2D) code image, or the like may be displayed on the first display screen 17 and the second display screen 18. The processor may perform face recognition or two-dimensional code recognition, such that pedestrian detection, face recognition, two-dimensional code recognition, and other functions may be achieved. Functions that can be achieved are not limited to the above-described examples.

The smart glasses of the disclosure can further establish a second channel directly with the remote controller, such that the smart glasses can receive a glasses control instruction directly from the remote controller through the second channel and perform a corresponding operation according to the glasses control instruction.

That is, the menu function of the smart glasses can be achieved through button control of the remote controller. For example, display backlight brightness, camera settings, photographing, video recording and the like that can be achieved by the smart glasses menu operations can also be accomplished through five-dimensional buttons, also referred to as "five-dimensional keys," on the remote controller. When the menu functions of the smart glasses are implemented through the remote controller, the remote controller may send a disabling instruction to the smart glasses through a third channel to disable the menu functions of the smart glasses. In some embodiments, control functions of the smart glasses corresponding to the first flight control instructions and gimbal control instructions may be disabled. That is, when the smart glasses detect that the remote controller is connected, the menu functions of the smart glasses may be disabled, and the smart glasses may be controlled by glasses control instructions of the remote controller.

As compared to controlling menus using buttons of the smart glasses, directly controlling the smart glasses through the buttons of the remote controller to achieve the menu functions of the smart glasses realizes a more convenient user operation and eliminate the need to switch between button operations of the remote controller and button operations of the smart glasses.

In some embodiments, the smart glasses can further establish a third channel directly with a mobile terminal, and the smart glasses may further send the FPV image data and/or flight status data received from the UAV to the mobile terminal through the third channel for display.

Further, the mobile terminal may generate a first flight control instruction and/or a gimbal control instruction according to a user input, and may send the first flight control instruction and/or the gimbal control instruction to the smart glasses through the third channel. Further, the smart glasses may send the first flight control instruction and/or the gimbal control instruction to the UAV through the first channel.

In some embodiments, the smart glasses may disable control functions of the smart glasses corresponding to the first flight control instruction and/or the gimbal control instruction after receiving the first flight control instruction and/or the gimbal control instruction from the mobile terminal. That is, in this case, the control instruction from the mobile terminal may be used to achieve the corresponding control function.

In some embodiments, the smart glasses and the mobile terminal can both achieve the corresponding control functions. If there is control instructions) from one of the smart glasses or the mobile terminal, an operation corresponding to the control instruction may be performed directly. If there are control instructions from the smart glasses and the mobile terminal at the same time, a priority may be determined according to a preset rule, and an operation corresponding to a control instruction with a higher priority may be performed. The preset rule may be set as needed. For example, an instruction from the smart glasses may be prioritized, or a control instruction from the mobile terminal may be prioritized. The setting of the preset rule is not restricted in the present disclosure.

In some embodiments, the UAV can communicate with the smart glasses through a wireless channel, to perform image transmission and to send and receive control signals. In some other embodiments, the UAV can communicate with the mobile terminal through wireless WiFi, to perform image transmission and to send and receive control signals.

The above-described second channel and third channel may include wireless channel(s) or wired channel(s).

The above-described implementation approaches are merely for illustrative purposes and are not intended to limit the scope of the present disclosure. Various other implementation approaches may be adopted. In some implementation approaches, the smart glasses, the remote controller, and the mobile terminal may be connected to each other through wireless connection(s) and/or wired connection(s), e.g., a USB connection.

In some embodiments, the smart glasses can also obtain a video file of the UAV directly from the UAV through the first channel, and play back the video file on the smart glasses.

Figure 3:
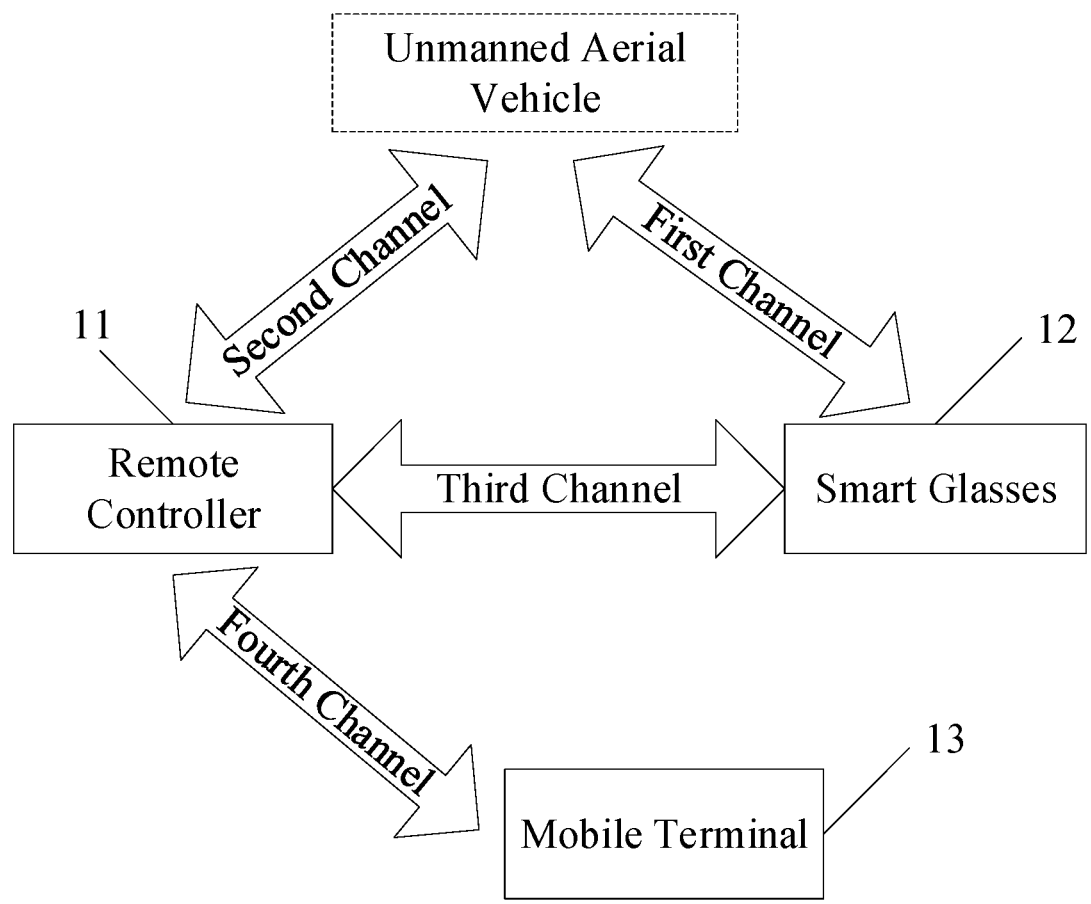
FIG. 3 is a schematic view of an exemplary unmanned aerial vehicle (UAV) control system according to various disclosed embodiments of the present disclosure.

FIG. 3 is a schematic view of an exemplary UAV control system according to various disclosed embodiments of the present disclosure. As shown in FIG. 3, the UAV control system includes a remote controller 11 and smart glasses 12. The smart glasses 12 can directly establish a first channel with the UAV 100 without relaying by the remote controller 11, such that the smart glasses 12 can receive FPV image data directly from the UAV through the first channel and display the FPV image data. The remote controller 11 can directly establish a second channel with the UAV 100 without relaying by the smart glasses 12, such that the remote controller can send a first flight control instruction directly to the UAV through the second channel.

In some embodiments, the first flight control instruction may include a control instruction for controlling the UAV flight. For example, the first flight control instruction may include a control instruction for controlling a flight status of the UAV, such as taking off, returning, flying back, forward, to left, and to right, throttling, turning left, turning right, etc.

In some embodiments, the smart glasses 12 can thriller receive flight status data directly from the UAV through the first channel and display the flight status data. The flight status data may include, but is not limited to, a location of the UAV, a direction of the UAV, remaining power, a flight path, obstacle information, flight altitude and flight speed, a nose orientation of the UAV, an orientation of a gimbal at the UAV, etc.

In some embodiments, the smart glasses 12 may include smart glasses configured to realize both virtual reality and augmented reality. With the smart glasses of the present disclosure, the flight status data may be displayed in a manner of augmented reality in superposition with the above-described FPV image data. For example, the FPV image data and the flight status data may be displayed in a picture-in-picture manner.

In some embodiments, the smart glasses 12 may include, but are not limited to, virtual reality glasses or augmented reality glasses.

In some embodiments, the smart glasses 12 may sense an attitude of the smart glasses 12 through a built-in attitude sensor and generate a gimbal control instruction. The smart glasses 12 may further send a gimbal control instruction directly to the UAV through the first channel. The attitude sensor may include, for example, an inertial measurement unit (IMU) or the like.

That is, the attitude of the smart glasses 12 can be sensed by the attitude sensor of the smart glasses 12 and converted into a corresponding gimbal control instruction for controlling the gimbal at the UAV and an imaging apparatus carried by the gimbal, such as a camera, a camera telescope, a remote camera, or a measuring instrument. In some embodiments, the gimbal control instruction may be used to achieve stabilization of the imaging apparatus, to adjust an attitude of the imaging apparatus, e.g., a tilt angle and a photographing direction of the imaging apparatus, for achieving high-quality shooting and/or photographing, etc. For example, a camera of the imaging apparatus carried by gimbal may be adjusted downward by adjusting the smart glasses downward, and the camera of the imaging apparatus carried by the gimbal may be adjusted to the left by turning the smart glasses to the left, and the examples are merely for illustrative purposes and are not intended to limit the scope of the present disclosure.

In some embodiments, the smart glasses 12 can sense a user gesture and generate a glasses control instruction. The smart glasses 12 may further perform a corresponding operation according to the glasses control instruction. The glasses control instruction may include an instruction for setting the smart glasses, such as display screen backlight brightness adjustment, a resolution of the smart glasses 12, or the like, and may also include a control instruction for controlling the imaging apparatus of the UAV, such as camera settings, photographing, video recording, etc.

That is, the menu operation of the smart glasses can be replaced by the smart glasses sensing user gestures, and the smart glasses menu functions can be realized through gesture operations. In some embodiments, the smart glasses 12 may include a front camera. In an augmented reality mode, an operation may be performed by the user clicking a finger to a position where a glasses icon is located. For example, in an augmented reality mode, operation menus of the smart glasses 12 may be displayed on an image plane. The user may click on a corresponding operation menu, and the camera of the smart glasses 12 may capture images of the user's click operation, and identify coordinates of a stable position of the user's finger in a certain time duration. By comparing the stable position of the user's finger with positions of the menus in the glasses, a glasses control instruction corresponding to the user's gesture operation may be recognized and a corresponding operation may be performed.

In some embodiments, the smart glasses 12 can sense a user gesture and generate a second flight control instruction. The smart glasses 12 can further send the second flight control instruction directly to the UAV through the first channel.

In some embodiments, the second flight control instruction may be same as the first flight control instruction, and both first and second flight control instructions may include a control instruction for controlling the UAV flight. For example, the second flight control instruction may include a control instruction for controlling a flight status of the UAV, such as taking off, returning, flying back, forward, to left, and to right, throttling, turning left, turning right, etc. Thus, flight control of the UAV may be realized by sensing the user's gesture operation through the smart glasses. In some embodiments, in response to the UAV receiving the second flight control instruction from the smart glasses 12 without receiving a first flight control instruction from the remote controller 11, the UAV may control the UAV flight under the second control instruction. In some other embodiments, in response to the UAV receiving the first flight control instruction from the remote controller 11 without receiving the second flight control instruction from the smart glasses 12, the UAV may control the UAV flight under the first control instruction. In response to receiving the flight control instructions from the smart glasses 12 and the remote controller 11 at the same time, the UAV may perform a priority determination according to a preset rule, and may control the UAV flight under a control instruction having a higher priority. The preset rule may be set in advance according to actual needs. In some embodiments, the control instruction from the smart glasses may be prioritized. In some other embodiments, the control instruction from the remote controller may be prioritized.

In some embodiments, the smart glasses may include a camera and a processor. The camera may capture a user gesture operation image. The processor may process the gesture operation image, determine coordinates of the gesture operation, and compare the coordinates of the gesture operation with an imaging position of a virtual operation interface for controlling UAV displayed over the smart glasses, such that the second flight control instruction corresponding to the user's gesture operation may be recognized, and a corresponding operation may be performed.

That is, the virtual operation interface may be displayed on the display screen of the smart glasses, and the image of the user's gesture operation is captured by the camera. The processor may process the image of the user's gesture operation to determine coordinates of the gesture operation, and compare the coordinates of the gesture operation with an imaging position of the virtual operation interface, such that the second flight control instruction corresponding to the user's gesture operation may be recognized, and a corresponding control operation may be performed.

In some embodiments, the smart glasses may include a camera, a memory, and a processor. The camera may be configured to capture a gesture motion of a user. The memory may store a plurality of user gesture motion models and a plurality of second flight control instructions corresponding to the plurality of user gesture motion models. The processor may be electrically connected to the camera and the memory. The processor may be configured to generate a gesture motion model according to the user gesture motion captured by the camera to compare with the plurality of user gesture motion models stored in the memory. In response to the generated gesture motion model being consistent with one of the plurality of user gesture motion models stored in the memory, a second flight control instruction corresponding to the one of the plurality of user gesture motion models may be triggered. That is, in response to the generated gesture motion model being consistent with one of the plurality of user gesture motion models stored in the memory, a second flight control instruction corresponding to the generated gesture motion model may be triggered.

The plurality of user gesture motion models stored in the memory may be obtained by photographing a plurality of user gesture motions through the camera and defining each user gesture motion model in advance. That is, by capturing and recognizing a plurality of user gesture motions in advance, corresponding user gesture motion models may be generated separately. Further, a second flight control instruction uniquely corresponding to each user gesture motion model may be defined and stored in the memory.

In some embodiments, the UAV can communicate with the smart glasses through a wireless channel, to perform image transmission and to send and receive control signals. In some other embodiments, the UAV can communicate with the mobile terminal through wireless WiFi, to perform image transmission and to send and receive control signals.

In some embodiments, a plurality of smart glasses may be added to the UAV control system to operate together as needed.

In some embodiments, the smart glasses not only can play real-time videos taken by the UAV, but also can obtain a video file of UAV from the UAV through a wired or wireless channel and play back the video file on the smart glasses.

Referring to FIG. 3, in some embodiments, the smart glasses 12 can further establish a third channel directly with the remote controller 11, such that the smart glasses 12 can receive a glasses control instruction directly from the remote controller 11 through the third channel, and perform a corresponding operation according to the glasses control instruction. That is, the menu function of the smart glasses 12 can be achieved through button control of the remote controller 11. For example, display backlight brightness, camera settings, photographing, video recording and the like that can be achieved by the smart glasses menu operations can also be accomplished through five-dimensional buttons on the remote controller 11. When the menu functions of the smart glasses 12 are implemented through the remote controller 11, the remote controller 11 may send a disabling instruction to the smart glasses 12 through the third channel to disable the menu functions of the smart glasses 12. In some embodiments, control functions of the smart glasses 12 corresponding to the first flight control instructions and gimbal control instructions may be disabled. That is, when the smart glasses 12 detect that the remote controller 11 is connected, the menu functions of the smart glasses 12 may be disabled, and the smart glasses 12 may be controlled by glasses control instructions of the remote controller.

As compared to controlling menus using buttons of the smart glasses, directly controlling the smart glasses 12 through the buttons of the remote controller 11 to achieve the menu functions of the smart glasses realizes a more convenient user operation and eliminates the need to switch between button operations of the remote controller 11 and button operations of the smart glasses 12.

Referring to FIG. 3, in some embodiments, the control system may further include a mobile terminal 13. The mobile terminal 13 and the remote controller 11 may directly establish a fourth channel between each other. The remote controller 11 may further send. FPV image data and/or flight status data received from the UAV to the mobile terminal 13 through the fourth channel for display.

Further, the mobile terminal may generate a first flight control instruction and/or a gimbal control instruction according to user input, and send the first flight control instruction and/or the gimbal control instruction to the remote controller 11 through the fourth channel. The remote controller 11 may send the first flight control instruction and/or the gimbal control instruction to the UAV through the second channel. Accordingly, the flight of the UAV and an imaging apparatus carried by the UAV can be controlled on the mobile terminal 13.

The remote controller 11 may disable control functions of the remote controller 11 corresponding to the first flight control instruction and/or the gimbal control instruction after receiving the first flight control instruction and/or the gimbal control instruction from the mobile terminal 13. That is, in this case, the control instruction from the mobile terminal 13 may be used to achieve the corresponding control function.

In some embodiments, the remote controller 11 and the mobile terminal 13 both can achieve the corresponding control functions. If there is control instructions) from one of the remote controller 11 or the mobile terminal 13, an operation corresponding to the control instruction may be performed directly. If there are control instructions from the remote controller 11 and the mobile terminal 13 at the same time, a priority may be determined according to a preset rule, and an operation corresponding to a control instruction with a higher priority may be performed. The preset rule may be set as needed. For example, a control instruction from the remote controller may be prioritized, or a control instruction from the mobile terminal may be prioritized, which is not restricted in the present disclosure.

Figure 4:
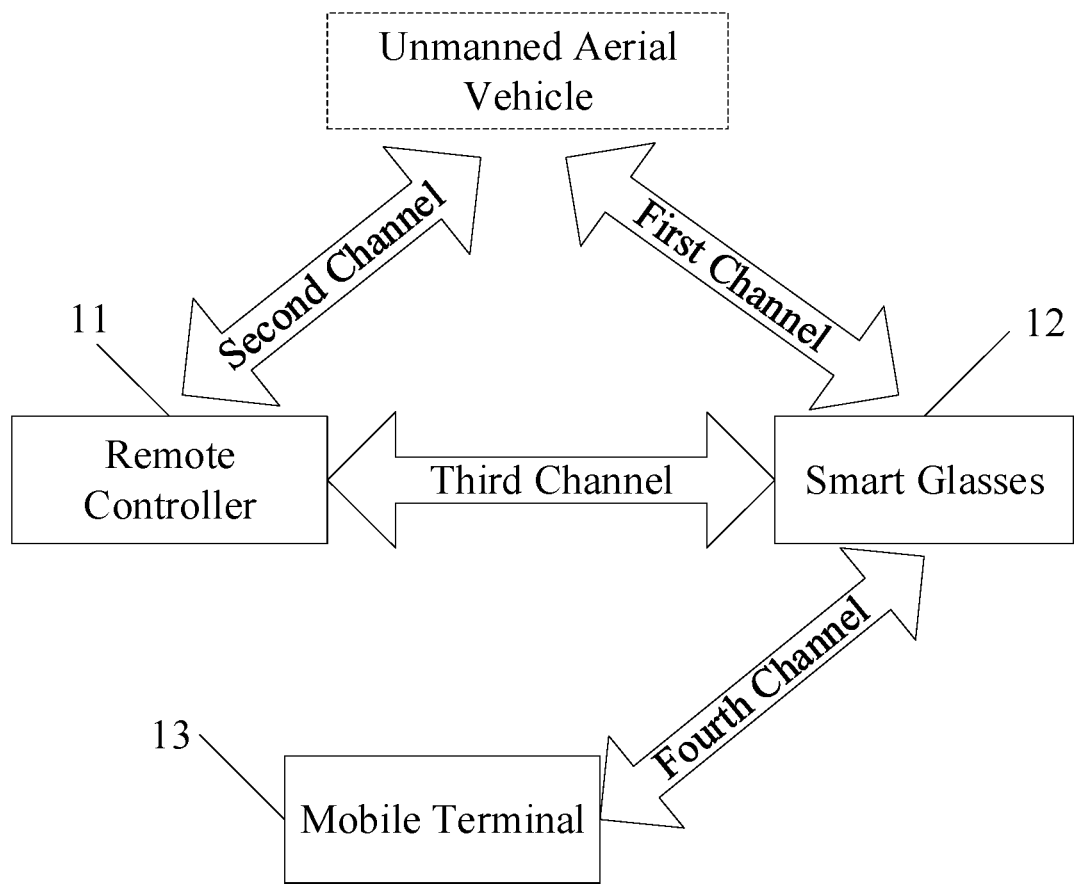
FIG. 4 is a schematic view of another exemplary UAV control system according to various disclosed embodiments of the present disclosure.

In some embodiments, the control system may include a mobile terminal 13. FIG. 4 is a schematic view of another exemplary UAV control system according to various disclosed embodiments of the present disclosure. As shown in FIG. 4, a mobile terminal 13 directly establishes a fourth channel with smart glasses 12. The smart glasses 12 may further send FPV image data and/or flight status data received from the UAV to the mobile terminal 13 through the fourth channel for display.

In some embodiments, the mobile terminal 13 may further generate a first flight control instruction and/or a gimbal control instruction according to user input, and may send the first flight control instruction and/or the gimbal control instruction to the smart glasses 12 through the fourth channel. Further, the smart glasses 12 may send the first flight control instruction and/or the gimbal control instruction to the UAV through the first channel.

The smart glasses 12 may disable control functions of the smart glasses corresponding to the first flight control instruction and/or the gimbal control instruction after receiving the first flight control instruction and/or the gimbal control instruction from the mobile terminal 13. That is, in this case, the control instruction from the mobile terminal may be used to achieve the corresponding control function.

In some embodiments, the smart glasses 12 and the mobile terminal 13 both can achieve the corresponding control functions. If there is control instruction(s) from one of the smart glasses or the mobile terminal, an operation corresponding to the control instruction may be performed directly. If there are control instructions from the smart glasses and the mobile terminal at the same time, a priority may be determined according to a preset rule, and an operation corresponding to a control instruction with a higher priority may be performed. The preset rule may be set as needed. For example, an instruction from the smart glasses may be prioritized, or a control instruction from the mobile terminal may be prioritized. The setting of the preset rule is not restricted in the present disclosure.

Based on the above-described control system of the disclosure, the flight of the UAV may be controlled through the remote controller 11, an immersive FPV flight may be experienced through the smart glasses 12, and transmitted images may be watched in real time through the mobile terminal. Under this mode, single-player or multi-player control of the UAV may be realized. For example, during a single-player control, the user may control the flight of the UAV through the remote controller 11, and may experience an immersive FPV flight through the smart glasses 12. The user may perform menu controls of the smart glasses, such as menu controls associated with display backlight brightness, camera setting, photographing, video recording and the like, through five-dimensional buttons on the remote controller. As another example, during a two-player or multiple-player control, a first user may control the flight of the UAV through the remote controller 11, a second user may wear the smart glasses 12 to join or leave at any time. Camera setting, photographing, and video recording may be controlled by the first user or the second user. As another example, a first user may wear the smart glasses 12 and use the remote controller 11 to control the UAV. A second user may view image transmission through a mobile terminal application (APP). Camera setting, photographing, and video recording may be controlled by the second user through the mobile terminal. The above examples are merely for illustrative purposes and are not intended to limit the scope of the present disclosure. Control approaches may be selected and adjusted according to various application scenarios.

In the above-described UAV control system consistent with the disclosure, the UAV, the remote controller, the smart glasses, and the mobile terminal may be connected to each other through a private wireless communication protocol, such that direct communications between each other may be realized without a need relaying.

The above-described implementation approaches are merely for illustrative purposes and are not intended to limit the scope of the present disclosure. Various other implementation approaches may be adopted. In some implementation approaches, the smart glasses, the remote controller, and the mobile terminal of the UAV control system may be connected through a wireless connection and/or a wired connection, e.g., a USB connection.

In the UAV control system consistent with the disclosure, the smart glasses can establish a first channel directly with the UAV without relaying by the remote controller, such that the smart glasses can receive FPV image data directly from the UAV through the first channel and display the FPV image data. The remote controller can establish a second channel directly with the UAV without relaying by the smart glasses, such that the remote controller can directly send a first flight control instruction to the UAV through the second channel. As such, since the remote controller and the smart glasses both may establish communication channels directly with the UAV, relaying may not be needed for transmission of images and control signals, and delay during transmission of images and control signals may be suppressed. Control accuracy of the UAV and safety of UAV flight can be improved.

In some embodiments, the menu function of the smart glasses can be realized through button control of the remote controller, such that the user may not need to frequently switch between remote controller buttons and the smart glasses, and the user operation may be more convenient.

In some embodiments, the user can view the image transmission on the mobile terminal, and can further control the UAV through the mobile terminal, such that multiple-player control of the UAV and FPV flight experience may be realized at the same time.

Figure 5:
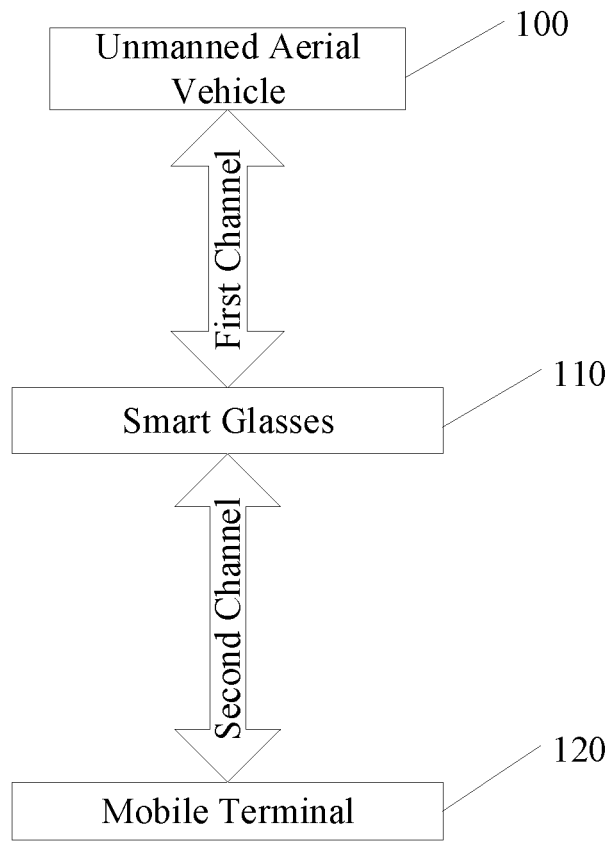
FIG. 5 is a schematic view of another exemplary UAV control system according to various disclosed embodiments of the present disclosure.

FIG. 5 is a schematic view of another exemplary UAV control system according to various disclosed embodiments of the present disclosure. As shown in FIG. 5, the UAV control system includes a UAV 100 and smart glasses 110. The smart glasses 110 can establish a first channel directly with the UAV 100 without a need for relaying, such that the smart glasses can receive FPV image data directly from the UAV through the first channel and display the FPV image data. The smart glasses 110 can further sense a user gesture, generate a first flight control instruction, and send the first flight control instruction directly to the UAV through the first channel.

In some embodiments, the first flight control instruction may include a control instruction for controlling a UAV flight. For example, the first flight control instruction may include a control instruction for controlling a flight status of the UAV, such as taking off, returning, flying back, forward, to left, and to right, throttling, turning left, turning right, etc.

In some embodiments, the smart glasses may include a camera and a processor. The camera may capture a user gesture operation image. The processor may process the gesture operation image, determine coordinates of the gesture operation, and compare the coordinates of the gesture operation with an imaging position of a virtual operation interface for controlling the UAV displayed on the smart glasses, such that a first flight control instruction corresponding to the user's gesture operation may be recognized, and a corresponding operation may be performed.

That is, by recognizing the gesture operation image, determining coordinates of the gesture operation, and comparing the coordinates of the gesture operation with the imaging position of the virtual operation interface of the UAV, an operation button position of the virtual operation interface corresponding to the gesture operation may be determined, and a flight control operation corresponding to the operation button may be directly performed.

In some embodiments, the smart glasses may include a camera, a memory, and a processor. The camera may be configured to capture a gesture motion of a user. The memory may store a plurality of user gesture motion models and a plurality of first flight control instructions corresponding to the plurality of user gesture motion models. The processor may be electrically connected to the camera and the memory. The processor may be configured to generate a user gesture motion model according to the user gesture motion captured by the camera to compare with the plurality of user gesture motion models stored in the memory. In response to the generated gesture motion model being consistent with one of the plurality of user gesture motion models stored in the memory, a first flight control instruction corresponding to the one of the plurality of user gesture motion models may be triggered. That is, in response to the generated gesture motion model being consistent with one of the plurality of user gesture motion models stored in the memory, a first flight control instruction corresponding to the generated gesture motion model may be triggered.

The plurality of user gesture motion models stored in the memory may be obtained by photographing a plurality of user gesture motions through the camera and defining each user gesture motion model in advance. That is, by capturing and recognizing a plurality of user gesture motions in advance, corresponding user gesture motion models may be generated. Further, a first flight control instruction uniquely corresponding to each user gesture motion model may be defined and stored in a memory.

In some embodiments, the smart glasses 110 can further receive flight status data directly from the UAV through the first channel and display the flight status data. The flight status data may include, but is not limited to, a location of the UAV, a direction of the UAV, remaining power, a flight path, obstacle information, flight altitude and flight speed, a nose orientation of the UAV, an orientation of a gimbal at the UAV, etc.

In some embodiments, the smart glasses may include smart glasses configured to realize both virtual reality and augmented reality. In the augmented reality mode of the smart glasses of the present disclosure, the flight status data may be displayed in superposition with the above-described FPV image data. For example, the FPV image data and the flight status data may be displayed in a picture-in-picture manner.

In some embodiments, the smart glasses 110 may include, but are not limited to, virtual reality glasses or augmented reality glasses.

In some embodiments, the smart glasses 110 may sense an attitude of the smart glasses 110 through a built-in attitude sensor and generate a gimbal control instruction. The smart glasses 110 may further send the gimbal control instruction directly to the UAV through the first channel.

That is, the attitude of the smart glasses 110 can be sensed by the attitude sensor of the smart glasses 110 and converted into a corresponding gimbal control instruction for controlling the gimbal at the UAV and an imaging apparatus carried by the gimbal, such as a camera, a camera telescope, a remote camera, or a measuring instrument. In some embodiments, the gimbal control instruction may be used to achieve stabilization of the imaging apparatus, to adjust an attitude of the imaging apparatus, e.g., a tilt angle and a photographing direction of the imaging apparatus, for high-quality shooting and/or photographing, etc. For example, a camera of the imaging apparatus carried by the gimbal may be adjusted downward by adjusting the smart glasses downward, and the camera of the imaging apparatus carried by the gimbal may be adjusted to the left by turning the smart glasses to the left, and the examples are merely for illustrative purposes and are not intended to limit the scope of the present disclosure.

In some embodiments, the smart glasses 110 can sense a user gesture and generate a glasses control instruction. The smart glasses 110 may further perform a corresponding operation according to the glasses control instruction. The glasses control instruction may include an instruction for setting the smart glasses, such as display screen backlight brightness adjustment, a resolution of the smart glasses 110, or the like, and may also include a control instruction for controlling an imaging apparatus of the UAV, such as camera settings, photographing, video recording, etc.

That is, the menu operation of the smart glasses can be replaced by the smart glasses sensing user gestures, and the smart glasses menu functions can be realized through gesture operations. In some embodiments, the smart glasses 110 may include a front camera. In an augmented reality mode, an operation may be performed by the user using a finger to click on a position where a glasses icon is located. For example, in an augmented reality mode, operation menus of the smart glasses 110 may be displayed on an image plane. The user may click on a corresponding operation menu. The camera of the smart glasses 110 may capture an image of the user's click operation and identify coordinates of a stable position of the user's finger in a certain time duration. By comparing the stable position of the user's finger with positions of the menus in the smart glasses, a glasses control instruction corresponding to the user's gesture operation may be recognized and a corresponding operation pray be performed.

Referring to FIG. 5, the control system consistent with the disclosure further includes a mobile terminal 120. The mobile terminal 120 may establish a second channel directly with smart glasses 110. The smart glasses 110 may further send FPV image data and/or flight status data received from a UAV 100 to the mobile terminal 120 through the second channel for display.

Further, the mobile terminal 120 may further generate a first flight control instruction and/or a gimbal control instruction according to user input, and may send the first flight control instruction and/or the gimbal control instruction to the smart glasses 110 through the second channel. Further, the smart glasses 110 may send the first flight control instruction and/or the gimbal control instruction to the UAV 100 through the first channel.

The smart glasses 110 may disable control functions of the smart glasses corresponding to the first flight control instruction and/or the gimbal control instruction after receiving the first flight control instruction and/or the gimbal control instruction from the mobile terminal 120. That is, in this case, the control instruction from the mobile terminal may be used to achieve the corresponding control function.

In some embodiments, the UAV 100 can communicate with the smart glasses 110 through a wireless channel, to perform image transmission and to send and receive control signals. In some other embodiments, the UAV can communicate with the mobile terminal 120 through wireless WiFi, to perform image transmission and to send and receive control signals.

In some embodiments, a plurality of smart glasses 110 may be added to the UAV control system to operate together as needed.

In some embodiments, the smart glasses 110 not only can play real-time videos taken by the UAV, but also can obtain a video file of the UAV from the UAV through a wired or wireless channel and play back the video file on the smart glasses 110.

In the embodiments of the present disclosure, in the UAV control system, smart glasses may communicate directly with the UAV, and directly control the UAV without a need for relaying. As such, delay during transmission of images control signals may be suppressed, a control accuracy of UAV may be improved, and safety of UAV flight may be improved.

In some embodiments, with the mobile terminal 120, the user can conveniently view the image transmission, and can realize control of the UAV and the smart glasses through operations on the mobile terminal, thereby facilitating the user's operation.

In the above-described UAV control system consistent with the disclosure, the UAV 100, the smart glasses 110, and the mobile terminal 120 may be connected to each other through a private wireless communication protocol, such that direct communications between each other may be realized without a need for relaying.

The above-described implementation approaches are merely for illustrative purposes and are not intended to limit the scope of the present disclosure. Various other other implementation approaches may be adopted. In some implementation approaches, the smart glasses 110 and the mobile terminal 120 of the UAV control system may be connected through a wireless connection and/or a wired connection, e.g., a USB connection.

Figure 6:
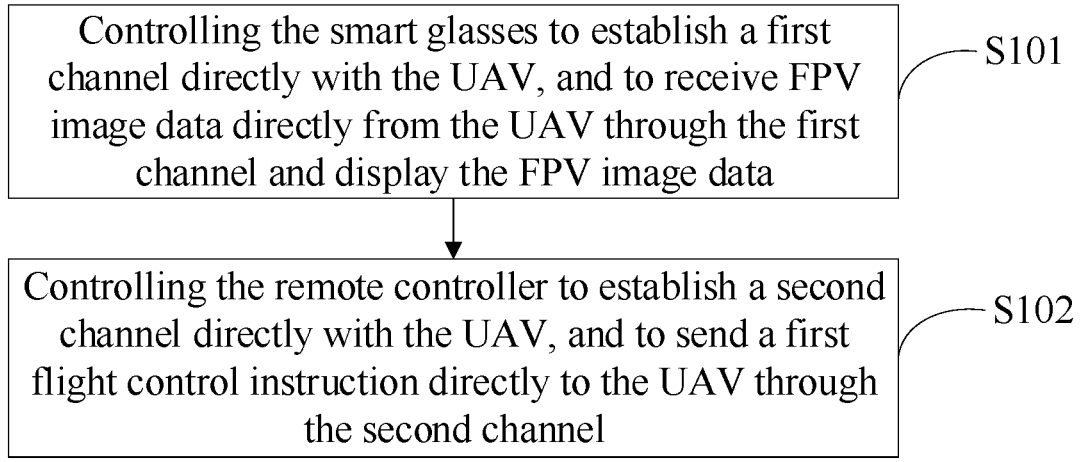
FIG. 6 is a flowchart of an exemplary control method for a first person view flight of unmanned aerial vehicle according to various disclosed embodiments of the present disclosure.

FIG. 6 is a flowchart of an exemplary control method for UAV FPV flight according to various disclosed embodiments of the present disclosure. The control method for the FPV UAV flight may be implemented based on smart glasses or a control system consistent with the disclosure, such as the smart glasses described above in connection with FIGS. 1-2 or the control system described above in connection with FIGS. 3 and 4. With reference to FIG. 6, the control method is described below.

At S101, the smart glasses are controlled to establish a first channel directly with the UAV, and to receive FPV image data directly from the UAV through the first channel and display the FPV image data.

In some embodiments, the smart glasses may be controlled to establish a connection with the UAV through a wireless private communication protocol, to achieve direction communications between the smart glasses and the UAV without relaying by a remote controller.

In some other embodiments, the UAV can also communicate with the mobile terminal through wireless WiFi, to perform image transmission and to send and receive control signals.

A plurality of smart glasses may be added to operate together as needed.

In some embodiments, the control method may further includes controlling the smart glasses to further receive flight status data directly from the UAV through the first channel and display the flight status data. The flight status data may include, but is not limited to, a location of the UAV, a direction of the UAV, remaining power, a flight path, obstacle information, flight altitude and flight speed, a nose orientation of the UAV, an orientation of a gimbal at the UAV, etc.

In some embodiments, the smart glasses may include smart glasses configured to realize both virtual reality and augmented reality. Through the smart glasses of the present disclosure, the flight status data may be displayed in superposition with the above-described FPV image data in a manner of augmented reality. For example, the FPV image data and the flight status data may be displayed in a picture-in-picture manner.

In some embodiments, the smart glasses may include, but are not limited to, virtual reality glasses or augmented reality glasses.

In some embodiments, the control method may further include controlling the smart glasses to sense an attitude of the smart glasses through a built-in attitude sensor and generate a gimbal control instruction, and controlling the smart glasses to further send the gimbal control instruction directly to the UAV through a first channel. The attitude sensor may include, for example, an inertial measurement unit (IMU) or the like.

That is, the attitude of the smart glasses can be sensed by the attitude sensor of the smart glasses and converted into a corresponding gimbal control instruction for controlling the gimbal at the UAV and an imaging apparatus carried by the gimbal, such as a camera, a camera telescope, a remote camera, or a measuring instrument. In some embodiments, the gimbal control instruction may be used to achieve stabilization of the imaging apparatus, to adjust an attitude of the imaging apparatus, e.g., a tilt angle and a photographing direction of the imaging apparatus, for achieving high-quality shooting and/or photographing, etc. For example, a camera of the imaging apparatus carried by the gimbal may be adjusted downward by adjusting the smart glasses downward, and the camera of the imaging apparatus carried by the gimbal may be adjusted to the left by turning the smart glasses to the left. The examples are for illustrative purposes and are not intended to limit the scope of the present disclosure.

In some embodiments, the control method consistent with the present disclosure may further include controlling the smart glasses to sense a user gesture and generate a glasses control instruction, and controlling the smart glasses to further perform a corresponding operation according to the glasses control instruction. The glasses control instruction may include an instruction for setting the smart glasses, such as display screen backlight brightness adjustment, a resolution of the smart glasses, or the like, and may also include a control instruction for controlling an imaging apparatus of the UAV, such as camera settings, photographing, video recording, etc.

That is, the menu operation of the smart glasses can be replaced by the smart glasses sensing user gestures, and the smart glasses menu functions can be realized through gesture operations. In some embodiments, the smart glasses may include a front camera. In an augmented reality mode, an operation may be performed by the user using a finger to click on a position where a glasses icon is located. For example, in an augmented reality mode, operation menus of the smart glasses may be displayed on an image plane. The user may click on a corresponding operation menu. The camera of the smart glasses may capture an image of the user's click operation and identify coordinates of a stable position of the user's finger in a certain time duration. By comparing the stable position of the user's finger with positions of the menus in the glasses, a glasses control instruction corresponding to the user's gesture operation may be recognized and a corresponding operation may be performed.

In some embodiments, the smart glasses not only can play real-time videos taken by the UAV, but also can obtain a video file from the UAV through a wired or wireless channel and play back the video file on the smart glasses.

At S102, the remote controller is controlled to establish a second channel directly with the UAV, and to send a first flight control instruction directly to the UAV through the second channel.

In some embodiments, the first flight control instruction may include a control instruction for controlling the UAV flight. For example, the first flight control instruction may include a control instruction for controlling a flight status of the UAV, such as taking off, returning, flying back, forward, to left, and to right, throttling, turning left, turning right, etc.

In some embodiments, the method may further include controlling the smart glasses to sense a user gesture and generate a second flight control instruction, and controlling the smart glasses to further send the second flight control instruction directly to the UAV through the first channel.

In some embodiments, the second flight control instruction may be same as the first flight control instruction, and both first and second flight control instructions may include a control instruction for controlling the UAV flight. For example, the first flight control instruction may include a control instruction for controlling a flight status of the UAV, such as taking off, returning, flying back, forward, to left, and to right, throttling, turning left, turning right, etc. That is, flight control of the UAV may be realized by sensing the user's gesture operation through the smart glasses. In some embodiments, in response to the UAV receiving the second flight control instruction from the smart glasses without receiving the first flight control instruction from the remote controller, the UAV may control the UAV flight under the second control instruction. In some embodiments, in response to the UAV receiving the first flight control instruction from the remote controller without receiving the second flight control instruction from the smart glasses, the UAV may control the UAV flight under the first control instruction. In response to receiving the flight control instructions from the smart glasses and the remote controller at the same time, the UAV may perform a priority determination according to a preset rule, and may control the UAV flight under a control instruction having a higher priority. The preset rule may be set in advance according to actual needs. In some embodiments, the control instruction from the smart glasses may be prioritized. In some other embodiments, the control instruction from the remote controller may be prioritized.

In some embodiments, the method may further include controlling the smart glasses to establish a third channel directly with the remote controller, such that the smart glasses can receive a glasses control instruction directly from the remote controller through the third channel, and can perform a corresponding operation according to the glasses control instruction. That is, the menu function of the smart glasses can be achieved through button control of the remote controller. For example, display backlight brightness, camera settings, photographing, video recording and the like that can be achieved by the smart glasses menu operations can also be accomplished through five-dimensional buttons on the remote controller. When the menu functions of the smart glasses are implemented through the remote controller, the remote controller may send a disabling instruction to the smart glasses through the third channel to disable the menu functions of the smart glasses. In some embodiments, control functions of the smart glasses corresponding to the first flight control instructions and gimbal control instructions may be disabled. That is, when the smart glasses detect that the remote controller is connected, the menu functions of the smart glasses may be disabled, and the smart glasses may be controlled by glasses control instructions of the remote controller.

As compared to controlling menus using buttons of the smart glasses, directly controlling the smart glasses through the buttons of the remote controller to achieve the menu functions of the smart glasses realizes a more convenient user operation and eliminate the need to switch between button operations of the remote controller and button operations of the smart glasses.

The numerals S101 and S102 are merely for distinguishing different processes, and are not intended to limit the sequence in which the processes are performed. The sequence of the above-described processes S101 and S102 is not restricted. In some embodiments, the two processes may be performed, for example, at the same time.

In some embodiments, the control method may further include controlling the mobile terminal to establish a fourth channel directly with the remote controller, and controlling the remote controller to receive FPV image data and/or flight status data from the UAV through the second channel and send the FPV image data and/or the flight status data to the mobile terminal through the fourth channel for display.

When the mobile terminal establishes the fourth channel directly with the remote controller, the mobile terminal may be controlled to further generate a first flight control instruction and/or a gimbal control instruction according to user input and to send the first flight control instruction and/or the gimbal control instruction to the remote controller through the fourth channel. Further, the remote controller may send the first flight control instruction and/or the gimbal control instruction to the UAV through the second channel.

The remote controller may disable control functions of the remote controller corresponding to the first flight control instruction and/or the gimbal control instruction after receiving the first flight control instruction and/or the gimbal control instruction from the mobile terminal. That is, in this case, the control instruction from the mobile terminal may be used to achieve the corresponding control function. In some embodiments, the remote controller and the mobile terminal both can achieve the corresponding control functions. If there is control instruction(s) from one of the remote controller or the mobile terminal, an operation corresponding to the control instruction may be performed directly. If there are control instructions from the remote controller and the mobile terminal at the same time, a priority may be determined according to a preset rule, and an operation corresponding to a control instruction with a higher priority may be performed. The preset rule may be set as needed. For example, a control instruction from the remote controller may be prioritized, or a control instruction from the mobile terminal may be prioritized. The setting of the preset rule is not restricted in the present disclosure.

In some embodiments, the mobile terminal may be controlled to establish a fourth channel directly with the smart glasses, and the smart glasses may be controlled to further send the FPV image data and/or the flight status data received from the UAV to the mobile terminal through the fourth channel for display.

When the mobile terminal establishes a fourth channel with the smart glasses, the mobile terminal may be controlled to further generate a first flight control instruction and/or a gimbal control instruction according to user input, and to send the first flight control instruction and/or the gimbal control instruction to the smart glasses through the fourth channel. Further, the smart glasses may send the first flight control instruction and/or the gimbal control instruction to the UAV through the first channel.

The above-described third channel and fourth channel may include a wireless channel and/or a wired channel.

The smart glasses may disable control functions of the smart glasses corresponding to the first flight control instruction and/or the gimbal control instruction after receiving the first flight control instruction and/or the gimbal control instruction from the mobile terminal. That is, in this case, the control instruction from the mobile terminal may be used to achieve the corresponding control function.

In some embodiments, the smart glasses and the mobile terminal can both achieve the corresponding control function. If there is control instruction(s) from one of the smart glasses or the mobile terminal, an operation corresponding to the control instruction may be performed directly. If there are control instructions from the smart glasses and the mobile terminal at the same time, a priority may be determined according to a preset rule, and an operation corresponding to a control instruction with a higher priority may be performed. The preset rule may be set as needed. For example, a control instruction from the smart glasses may be prioritized, or a control instruction from the mobile terminal may be prioritized. The setting of the preset rule is not restricted in the present disclosure.

In the above-described embodiments, the UAV, the remote controller, the smart glasses, and the mobile terminal may be connected to each other through a private wireless communication protocol, such that direct communications between each other may be realized without a need for relaying.

In some embodiments, the mobile terminal may also be controlled to establish a wireless channel directly with the UAV. The mobile terminal may receive an FPV image from the UAV through the wireless channel and display the FPV image. The UAV may receive a flight control instruction from the mobile terminal through the wireless channel.

The above-described implementation approaches are merely for illustrative purposes and are not intended to limit the scope of the present disclosure. Various other implementation approaches may be adopted. In some implementation approaches, the smart glasses, the remote controller, and the mobile terminal may be connected through a wireless connection and/or a wired connection, e.g., a USB connection.

In some embodiments, the control method may further include controlling the smart glasses to obtain a video file of the UAV directly from the UAV through the first channel, and play back the video file on the smart glasses.

In some embodiments, a plurality of smart glasses may be added to operate together as needed.

In the above-described control method and system for controlling UAV FPV flight consistent with disclosure, the smart glasses can directly establish a first channel with the UAV without relaying by the remote controller, such that the smart glasses can receive FPV image data directly from the UAV through the first channel and display the FPV image data. The remote controller can directly establish a second channel with the UAV without relaying by the smart glasses, such that the remote controller can send a first flight control instruction directly to the UAV through the second channel. As such, since the remote controller and the smart glasses both may establish communication channels directly with the UAV, relaying may not be needed for transmission of images control signals, and delay during transmission of images control signals may be suppressed. A control accuracy of the UAV and safety of UAV flight may be improved.

In addition, the menu function of the smart glasses can be realized through button control of the remote controller, such that the user may not need to frequently switch between remote controller buttons and the smart glasses, and the user operation may be more convenient.

In addition, the user can view the image transmission on the mobile terminal, and can further control the UAV through the mobile terminal, such that multiple-player control of the UAV and FPV flight experience may be realized at the same time.

Figure 7:
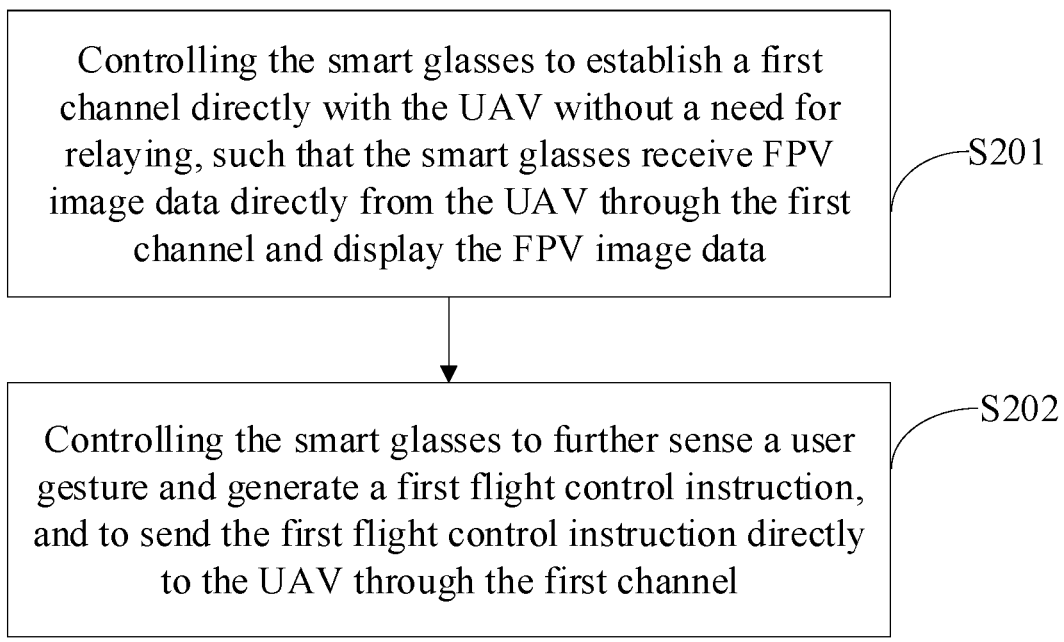
FIG. 7 is a flowchart of another exemplary control method for a first person view flight of unmanned aerial vehicle according to various disclosed embodiments of the present disclosure.

FIG. 7 is a flowchart of another exemplary control method for UAV FPV flight according to various disclosed embodiments of the present disclosure. The control method for the FPV UAV flight may be implemented based on smart glasses or a control system consistent with the disclosure, such as the smart glasses described above in connection with FIGS. 1-2 and the control system described above in connection with FIG. 5. With reference to FIG. 7, the control method is described below.

At S201, the smart glasses are controlled to establish a first channel directly with the UAV without a need for relaying, such that the smart glasses receive FPV image data directly from the UAV through the first channel and display the FPV image data.

In some embodiments, the control method may further include controlling the smart glasses to further receive flight status data directly from the UAV through the first channel and display the flight status data. The flight status data may include, but is not limited to, a location of the UAV, a direction of the UAV, remaining power, a flight path, obstacle information, flight altitude and flight speed, a nose orientation of the UAV, an orientation of a gimbal at the UAV, etc.

In some embodiments, the smart glasses may include smart glasses configured to realize both virtual reality and augmented reality, and can display the flight status data in a manner of augmented reality in superposition with the FPV image data. For example, the FPV image data and the flight status data may be displayed in a picture-in-picture manner.

In some embodiments, the smart glasses may also include, but are not limited to, virtual reality glasses or augmented reality glasses.

At S202, the smart glasses may be controlled to further sense a user gesture and generate a first flight control instruction, and to send the first flight control instruction directly to the UAV through the first channel.

In some embodiments, the first flight control instruction may include a control instruction for controlling the UAV flight. For example, the first flight control instruction may include a control instruction for controlling a flight status of the UAV, such as taking off, returning, flying back, forward, to left, and to right, throttling, turning left, turning right, etc.

Various implementation approaches may be used to sense the user gesture and generate the first flight control instruction, including two exemplary approaches described below.

In one approach, the camera of the smart glasses may be controlled to capture a user gesture operation image, and the gesture operation image may be processed to determine coordinates of the gesture operation. The coordinates of the gesture operation may be compared with an imaging position of a virtual operation interface for controlling the UAV displayed on the smart glasses, such that the first flight control instruction corresponding to the user's gesture operation may be recognized, and a corresponding operation may be performed.

That is, by recognizing the gesture operation image, determining coordinates of the gesture operation, and comparing the coordinates of the gesture operation with the imaging position of the virtual operation interface of the UAV, an operation button position of the virtual operation interface corresponding to the gesture operation may be determined, and a flight control operation corresponding to the operation button may be directly performed.

In another approach, the camera of the smart glasses may be controlled to capture a user gesture motion, and a gesture motion model may be generated according to the user gesture motion, and be compared with a plurality of pre-stored user gesture motion models in the smart glasses. In response to the generated gesture motion model being consistent with one of the plurality of pre-stored user gesture motion models, a control instruction corresponding to the one of the plurality of user gesture motion models may be triggered.

The plurality of pre-stored user gesture motion models may be obtained by photographing a plurality of user gesture motions through the camera of the smart glasses and defining each user gesture motion model in advance. That is, by capturing and recognizing a plurality of user gesture motions in advance, corresponding user gesture motion models may be generated. Further, a first flight control instruction uniquely corresponding to each user gesture motion model may be defined and stored in a memory.

In some embodiments, the smart glasses may be controlled to sense an attitude of the smart glasses through a built-in attitude sensor and generate a gimbal control instruction. The smart glasses may be controlled to further send the gimbal control instruction directly to the UAV through the first channel.

That is, the attitude of the smart glasses can be sensed by the attitude sensor of the smart glasses and converted into a corresponding gimbal control instruction for controlling the gimbal at the UAV and an imaging apparatus carried by the gimbal, such as a camera, a camera telescope, a remote camera, or a measuring instrument. In some embodiments, the gimbal control instruction may be used to achieve stabilization of the imaging apparatus, to adjust an attitude of the imaging apparatus, e.g., a tilt angle and a photographing direction of the imaging apparatus, for achieving high-quality shooting and/or photographing, etc. For example, a camera of the imaging apparatus carried by the gimbal may be adjusted downward by adjusting the smart glasses downward, and the camera of the imaging apparatus carried by the gimbal may be adjusted to the left by turning the smart glasses to the left. The examples are for illustrative purposes and are not intended to limit the scope of the present disclosure.

In some embodiments, the smart glasses may also be controlled to sense a user gesture and generate a glasses control instruction, and to perform a corresponding operation according to the glasses control instruction. The glasses control instruction may include an instruction for setting the smart glasses, such as display screen backlight brightness adjustment, a resolution of the smart glasses, or the like, and may also include a control instruction for controlling the imaging apparatus of the UAV, such as camera settings, photographing, video recording, etc.

That is, the menu operation of the smart glasses can be replaced by the smart glasses sensing user gestures, and smart glasses menu functions can be realized through gesture operations. In some embodiments, the smart glasses may include a front camera. In an augmented reality mode, an operation may be performed by the user using a finger to click on a position where a glasses icon is located. For example, in an augmented reality mode, operation menus of the smart glasses may be displayed on an image plane. The user may click on a corresponding operation menu. The camera of the smart glasses may capture an image of the user's click operation and identify coordinates of a stable position of the user's finger in a certain time duration. By comparing the stable position of the user's finger with positions of the menus in the glasses, a glasses control instruction corresponding to the user's gesture operation may be recognized and a corresponding operation may be performed.

In some embodiments, the control method may further include controlling the mobile terminal to establishes a second channel directly with the smart glasses, and controlling the smart glasses to further send FPV image data and/or flight status data received from a UAV to the mobile terminal through the second channel for display.

In some embodiments, the mobile terminal may be controlled to further generate a first flight control instruction and/or a gimbal control instruction according to user input, and to send the first flight control instruction and/or the gimbal control instruction to the smart glasses through the second channel. Further, the smart glasses may send the first flight control instruction and/or the gimbal control instruction to the UAV through the first channel.

In some embodiments, the control method may further include controlling the mobile terminal to establish a wireless channel directly with the UAV, controlling the mobile terminal to receive FPV images from the UAV through the wireless channel and display the FPV images, and controlling the UAV to receive a flight control instruction from the mobile terminal through the wireless channel.

That is, the UAV can communicate with the smart glasses through the wireless channel, to perform image transmission and to send and receive control signals. In some other embodiments, the UAV can communicate with the mobile terminal through wireless WiFi, to perform image transmission and to send and receive control signals.

In some embodiments, a plurality of smart glasses may be added to the UAV control system to operate together as needed.

In some embodiments, the smart glasses may also be controlled to obtain a video file of the UAV directly from the UAV through a wired or wireless channel, and play back the video file on the smart glasses.

In the above-describe method, the smart glasses and the mobile final may be connected through a wireless connection and/or a wired connection, e.g., a USB connection.

The present disclosure provides a control method and a control system for FPV UAV flight. The control system may include a remote controller and smart glasses. The smart glasses can establish a first channel directly with the UAV without relaying by the remote controller, such that the smart glasses can receive FPV image data directly from the UAV through the first channel and display the FPV image data. The remote controller can establish a second channel directly with the UAV without relaying by the smart glasses, such that the remote controller can directly send a first flight control instruction to the UAV through the second channel. Accordingly, the UAV may be directly controlled without a need for relaying, delay during transmission of images control signals may be reduced, and a control accuracy may be improved.

Those of ordinary skill in the art, will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A system for controlling an unmanned aerial vehicle (UAV) comprising:
   smart glasses configured to:
      establish a first channel directly with the UAV;
      receive first person view (FPV) image data directly from the UAV through the first channel; and
      display the FPV image data;
   a remote control separate from the smart glasses, wherein the remote control is configured to establish a second channel directly with the UAV and send a first flight control instruction corresponding to the FPV image data directly to the UAV through the second channel, and establish a fourth channel directly with the mobile terminal; and a mobile terminal configured to display the FPV image data received from the UAV and forwarded by the remote control, wherein:
the smart glasses are further configured to establish a third channel directly with the remote control for the remote control to send, through the third channel, a disabling instruction for disabling one or more menu functions of the smart glasses and a smart glasses control instruction for performing a corresponding operation to the smart glasses, to the smart glasses, wherein the disabled one or more menu functions correspond to a second flight control instruction for controlling flight of the UAV or a gimbal control instruction for controlling a rotation of a gimbal configured on the UAV, and the gimbal carries an imaging apparatus for collecting the FPV image data; and
each channel is established exclusively for a communication between two of the UAV, the smart glasses, the remote control, and the mobile terminal.

2. The system according to claim 1, wherein the smart glasses are further configured to receive flight status data directly from the UAV through the first channel and display the flight status data.

3. The system according to claim 2, wherein the smart glasses are further configured to display the flight status data by superimposing the flight status data on the FPV image data in an augmented reality mode.

4. The system according to claim 1, wherein the smart glasses are further configured to:
sense an attitude of the smart glasses;
generate the gimbal control instruction according to the attitude; and
send the gimbal control instruction directly to the UAV through the first channel.

5. The system according to claim 1, wherein the smart glasses are further configured to:
sense a user gesture;
generate a glasses control instruction according to the user gesture; and
perform an operation according to the glasses control instruction.

6. The system according to claim 1, wherein:
the smart glasses are further configured to:
sense a user gesture;
generate the second flight control instruction according to the user gesture; and
send the second flight control instruction directly to the UAV through the first channel.

7. The system according to claim 6, wherein the smart glasses include:
a camera configured to capture an image of a user gesture operation; and
a processor configured to:
process the image of the user gesture operation;
determine coordinates of the user gesture operation; and
compare the coordinates of the user gesture operation with an imaging position of a virtual operation interface displayed on the smart glasses for controlling the UAV, to recognize the second flight control instruction corresponding to the user gesture operation and to perform an operation corresponding to the second flight control instruction.

8. The system according to claim 6, wherein the smart glasses include:
a camera configured to capture a user gesture motion;

a memory storing a plurality of user gesture motion models and a plurality of second flight control instructions corresponding to the plurality of user gesture motion models; and
a processor electrically coupled to the camera and the memory, and configured to:
generate a gesture motion model according to the user gesture motion;
compare the generated gesture motion model with the plurality of user gesture motion models stored in the memory; and
trigger the second flight control instruction corresponding to the generated gesture motion model in response to the generated gesture motion model being consistent with one of the plurality of user gesture motion models stored in the memory.

9. The system according to claim 8, wherein the plurality of user gesture motion models stored in the memory are obtained by photographing a plurality of user gesture motions through the camera and defining the user gesture motion models to correspond to the plurality of user gesture motions, respectively.

10. The system according to claim 1, wherein the remote control is further configured to:
receive at least one of the FPV image data or flight status data from the UAV through the second channel.

11. The system according to claim 1, wherein:
the mobile terminal is configured to generate at least one of a third flight control instruction or a gimbal control instruction according to user input and send the at least one of the third flight control instruction or the gimbal control instruction to the remote control through the fourth channel; and
the remote control is further configured to send the at least one of the first flight control instruction or the gimbal control instruction to the UAV through the second channel.

12. The system according to claim 1, wherein the smart glasses are further configured to send flight status data received from the UAV to the remote control through the third channel for forwarding to the mobile terminal through the fourth channel for display.

13. The system according to claim 12, wherein:
the mobile terminal is configured to generate at least one of a third flight control instruction or a gimbal control instruction according to user input and send the at least one of the third flight control instruction or the gimbal control instruction to the smart glasses through the remote control; and
the smart glasses are further configured to send the at least one of the second flight control instruction or the gimbal control instruction to the UAV through the first channel.

14. The system according to claim 1, wherein the mobile terminal is further configured to:
establish a wireless channel directly with the UAV;
receive the FPV image data from the UAV through the wireless channel and display the FPV image data; and
send a third flight control instruction according to user input to the UAV through the wireless channel.

15. The system according to claim 1, wherein the smart glasses are further configured to:
obtain a video file directly from the UAV through the first channel; and
play back the video file.

16. The system according to claim 1, wherein the remote control comprises:

buttons configured to implement the menu function of the smart glasses,
wherein the buttons are five-dimensional buttons, and wherein the menu function includes display brightness, camera settings, photographing, and video recording.

17. The system according to claim 1, wherein the operation corresponding to the smart glasses control instruction includes adjusting, through the remote control, a display parameter of the smart glasses.

18. The system according to claim 17, wherein the display parameter of the smart glasses includes a display backlight brightness of the smart glasses.

19. A method for controlling an unmanned aerial vehicle (UAV) comprising:
controlling smart glasses to establish a first channel directly with the UAV;
controlling the smart glasses to receive first person view (FPV) image data directly from the UAV through the first channel and to display the FPV image data;
controlling a remote control that is separate from the smart glasses to establish a second channel directly with the UAV and send a first flight control instruction corresponding to the FPV image data directly to the UAV through the second channel;
controlling a mobile terminal to display the FPV image data received from the UAV and forwarded by the smart glasses;
controlling the smart glasses to establish a third channel directly with the remote control, and controlling the remote control to send, through the third channel, a disabling instruction for disabling one or more menu functions of the smart glasses and a smart glasses control instruction for performing a corresponding operation to the smart glasses, to the smart glasses; and
controlling the remote control to establish a fourth channel directly with the mobile terminal,
wherein the disabled one or more menu functions correspond to a second flight control instruction for controlling flight of the UAV or a gimbal control instruction for controlling a rotation of a gimbal configured on the UAV, and the gimbal carries an imaging apparatus for collecting the FPV image data; and
each channel is established exclusively for a communication between two of the UAV, the smart glasses, the remote control.

20. The method according to claim 19, further comprising:
controlling the smart glasses to sense a user gesture to generate the second flight control instruction by:
controlling a camera of the smart glasses to capture an image of a user gesture operation, processing the image of the gesture operation to determine coordinates of the user gesture operation, and comparing the coordinates of the user gesture operation with an imaging position of a virtual operation interface displayed on the smart glasses for controlling the UAV, to recognize the second flight control instruction corresponding to the user gesture operation and to perform an operation corresponding to the second flight control instruction; or
controlling the camera of the smart glasses to capture a user gesture motion, generating a gesture motion model according to the user gesture motion, comparing the gesture motion model with a plurality of pre-stored user gesture motion models in the smart glasses, and, in response to the gesture motion model being consistent with one of the plurality of pre-stored user gesture motion models, triggering the second flight control instruction corresponding to the gesture motion model; and
controlling the smart glasses to send the second flight control instruction directly to the UAV through the first channel.

* * * * *